United States Patent [19]

Szejtli et al.

[11] 4,274,985
[45] Jun. 23, 1981

[54] CYCLODEXTRIN-POLYVINYL ALCOHOL POLYMERS AND A PROCESS FOR THE PREPARATION THEREOF IN A PEARL, FOIL, FIBER OR BLOCK FORM

[75] Inventors: József Szejtli; Éva Fenyvesi; Sandor Zoltan; Béla Zsadon; Ferenc Tüdos, all of Budapest, Hungary

[73] Assignee: Chinoin Gyógyszer és Vegyészeti Termékek Gyára Rt., Budapest, Hungary

[21] Appl. No.: 55,536

[22] Filed: Jul. 9, 1979

[30] Foreign Application Priority Data

Jul. 13, 1978 [HU] Hungary ............................. CI 1845

[51] Int. Cl.³ ............................................. C08L 5/16
[52] U.S. Cl. .................................. 260/17.4 ST; 260/9
[58] Field of Search ............................ 260/17.4 ST, 9

[56] References Cited

U.S. PATENT DOCUMENTS 3,420,788   1/1969   Solms ................................. 260/17.4

FOREIGN PATENT DOCUMENTS 1244990   9/1971   United Kingdom ............ 260/17.4 ST Primary Examiner—Edward M. Woodberry
Attorney, Agent, or Firm—Karl F. Ross

[57] ABSTRACT

The present invention concerns new cyclodextrin-polyvinyl alcohol polymers capable of forming inclusion complexes. The preparation of said polymers by cross-linking a cyclodextrin, a mixture of cyclodextrins, or carbohydrate mixtures containing cyclodextrins in the presence of polyvinyl alcohol, polyvinyl acetate or a polyvinyl alcohol-polyvinyl acetate copolymer, with a polyfunctional coupling reactant capable of reacting with the cyclodextrins and with the polymers present is also within the scope of the invention.

14 Claims, No Drawings

CYCLODEXTRIN-POLYVINYL ALCOHOL POLYMERS AND A PROCESS FOR THE PREPARATION THEREOF IN A PEARL, FOIL, FIBER OR BLOCK FORM

This invention relates to new cyclodextrinpolyvinyl alcohol polymers capable of forming inclusion complexes and a process for the preparation thereof in a pearl, foil, fiber or block form.

Cyclodextrins are non-reducing cyclic dextrins having a well-defined inner diameter and are capable of forming inclusion complexes. They consist of D-glucose units, which are connected with each other by $\alpha$-1,4-bonds $\alpha$-Cyclodextrin comprises 6, $\beta$-cyclodextrin 7 and $\gamma$-cyclodextrin 8 $\alpha$-D-glucose units.

By reacting with suitable polyfunctional compounds cyclodextrins can be converted into macromolecular compounds, which favorably combine the complex forming capability of cyclodextrins with the properties of polymeric compounds.

Starting from a mixture of cyclodextrins and other carbohydrates Bruckler and his co-workers (U.S. patent specification Ser. No. 344,248, now U.S. Pat. No. 3,472,835) prepared block polymers. Wiedenhof and his co-workers (British patent specification No. 1,244,990) prepared by cyclodextrin-containing pearl polymers. Another publication (Published Neth. patent specification No. 6,505,361) relates to the preparation of resins containing a mixture of cyclodextrins and other carbohydrates.

In the same patent specification the preparation of inclusion resins comprising cyclodextrins dispersed in water-insoluble synthetic polymers (e.g. polyamide, polyvinyl acetate, polyacryl amide) is also described. In these inclusion resins cyclodextrins are not bound chemically.

It is well known that polymers containing cyclodextrins ($\alpha$, $\beta$- and $\gamma$-cyclodextrins) form inclusion complexes with molecules having a suitable size and shape. Said inclusion complexes can generally be prepared from aqueous solutions. Due to their complex forming property water-insoluble cyclodextrin polymers can be advantageously and economically used, for example, for the separation and enrichment of various substances from aqueous solutions; for the stabilization of substances prone to decomposition in the form of their inclusion complexes; for application in inclusion chromatography; for smoke filtration; and as catalysts to accelerate various reactions. Complexes formed with cyclodextrin polymers can be separated from their solutions by conventional techniques, such as filtration or sedimentation, and the polymers can easily be regenerated and recycled.

In practice loose, easily permeable, well swellable polymer preparations are preferably used, since the rate of complex formation is primarily determined by the accessibility of the cyclodextrin rings incorporated into the polymer. On the other hand the swelled preparations should be firm, elastic and should have a good retentivity. The well swellable cyclodextrin polymers known in the art, which have been prepared by known methods, are less firm and elastic, and this fact strongly limits their field of application. These known polymers are, for exmple, not suitable for the preparation of foils and fibers.

The present invention aims at the preparation of cyclodextrin-polyvinyl alcohol polymers in the form of pearls, foils, fibers or blocks, which are well swellable in aqueous solutions and are solid also in a swelled state, are elastic and have a good retentivity, are chemically stable, preserve their original properties during repeated use, purification and drying, are resistant to microorganisms and due to the above-listed properties can be used for complex formation more advantageously than related preparations known in the art.

This invention relates to cyclodextrin-polyvinyl alcohol polymers, which can be formulated as pearls, fibers, blocks or foils.

According to another aspect of this invention there is provided a process for the preparation of new cyclodextrin-polyvinyl alcohol polymers capable of forming inclusion complexes in various forms. The process comprises cross-linking a cyclodextrin or a mixture of various cyclodextrins or carbohydrate mixtures containing cyclodextrins with a suitable polyfunctional reactant capable of reaction with cyclodextrin in the presence of polyvinyl alcohol, polyvinyl acetate or polyvinyl alcohol-acetate copolymer.

Suitable representatives of polyfunctional reactants are the epoxy-compounds, such as epichlorohydrin, or diepoxy-compounds, e.g. ethylene glycol diepoxy polyether.

Either epoxy or diepoxy compounds are used for the polymerization, the reaction is expediently carried out in an aqueous alkaline solution. Under these conditions the epoxide group can be hydrolyzed to hydroxyl, which can react with further epichlorohydrine or diepoxide molecules to afford a product in which the cyclodextrin-cyclodextrin, cyclodextrin-polyvinyl alcohol and polyvinyl alcohol-polyvinyl alcohol cross-bonds can be of different lengths.

Depending on the reaction parameters and the technique used, cyclodextrin-polyvinyl alcohol polymers can be obtained as pearls, foils, fibers or blocks. In this respect the degree of polymerization is entirely irrelevant since cross-linked products consisting of a single molecule are obtained.

Pearl polymers can be obtained in a suspension. If a cyclodextrin-polyvinyl alcohol polymer is to be prepared, as a dispersion medium, a solvent restrictedly miscible with the reaction medium, preferably a hydrocarbon, such as toluene, and an emulsifying agent, preferably a solution of polyvinyl acetate (PVAc) can be used. The reaction medium is a solution prepared with a polar solvent, preferably water, which contains cyclodextrin ($\alpha$-, $\beta$- or $\gamma$-cyclodextrin) or a mixture of cyclodextrin homologs of a carbohydrate mixture containing cyclodextrins, 0.1–10% of polyvinyl alcohol or a polyvinyl alcohol-acetate copolymer, and a catalyst, preferably a base. The concentration of the base depends on the cross-linking reactant (polyfunctional compound). For instance if epichlorohydrine is used, the concentration thereof preferably amounts to 10 to 20%, while the amount of ethylene glycol diepoxy propyl ether preferably is between 2 and 4%. The solution is dispersed in a dispersion medium with stirring, under conditions providing a suspension having a desired dispersity grade. Thereafter the polyfunctional cross-linking agent is added into the system in one portion or gradually, within a predetermined time, and the reaction is carried out under suitable conditions, with stirring. Varying the cyclodextrin to a coupling agent ratio between 1:3 and 1:10, a solid, regular spherical product is obtained, which has a good retentivity and can be settled when the reaction terminates. It is then preferably washed with solvents and is subsequently dried. If the dispersion phase contains polyvinyl acetate, polyvinyl alcohol incorporates into the product even then, when no polyvinyl alcohol was introduced into the reaction medium. This can be explained by the fact that under suitable conditions polyvinyl acetate is hydrolyzed and the hydrolysis product is dissolved in the molar phase. The cyclodextrin concentration in the cyclodextrin-polyvinyl alcohol pearl polymer prepared as described above, can be as high as 50 to 70%, its water uptake can be varied between 1 and 5 g. of water/g. of resin, and the product can be used for the preparation of inclusion complexes with suitable components of solutions, gases or vapors. It is especially suitable for the purification of industrial waste waters and for use in inclusion chromatography. From aqueous solutions, for example, benzene and chloroform traces can be eliminated in this manner. From waste waters, especially p-cresol and O,O-dimethyl-1-hydroxy-2,2,2-trichloroethyl, phosphate can easily be eliminated by the above-described polymers.

When a polymer foil is to be prepared, 30 to 40% of cyclodextrin ($\alpha$-, $\beta$- or $\gamma$-cyclodextrin) or a mixture of cyclodextrin homologs, or a cyclodextrin-containing carbohydrate mixture is suitably dissolved in a solution of 5 to 15% of polyvinyl alcohol in a polar solvent, preferably in an aqueous alkaline solution.

To the solution obtained, a slight excess of a polyfunctional coupling agent is added, and the mixture is allowed to stand to initiate the coupling reactions. If the solution is poured onto a flat surface as a result of the coupling reactions a foil is obtained. The product is then washed and dried. The cyclodextrin-polyvinyl alcohol foils produced by this method are especially well swellable in water, are elastic in a swelled state, are not rigid and are flexible. Cyclodextrin-polyvinyl alcohol foils can contain up to 40 to 50% of cyclodextrin-and are capable of forming inclusion complexes from solutions.

Polymer fibers can be prepared by two methods. According to the first one, the procedure described for the preparation of foils is followed except that the viscous solution is not poured onto a flat surface, instead it is introduced into a precipitation bath where fibers are pulled. As a precipitation bath preferably a saturated solution of sodium sulphate is used. According to an alternative method, a solution containing polyvinyl alcohol and a coupling agent is introduced into a precipitation bath which also contains a water-soluble polymer prepared starting from cyclodextrin ($\alpha$-, $\beta$- or $\gamma$-cyclodextrin) or from a mixture of cyclodextrin homologs or from a cyclodextrin-containing carbohydrate mixture (British patent specification No. 1,244,990). Independent of the method employed, the polyvinyl alcohol concentration of the solution should preferably be 15 to 17%. The product obtained is washed and thereafter is subjected to heat treatment. Flexible, well swellable fibers are obtained, which contain 5 to 15% of cyclodextrin and are capable of forming inclusion complexes from solutions.

Block polymers are prepared starting from various solutions containing polyvinyl alcohol, cyclodextrin ($\alpha$, $\beta$- or $\gamma$-cyclodextrin), a mixture of cyclodextrins or a mixture of cyclodextrin and carbohydrates as well as a polyfunctional reactant. The product obtained is washed, dried and finally is pulverized. The powder obtained has a high specific surface, a good filterability, it is easy to handle and can be used for the formation of inclusion complexes from solutions, gases or vapors.

The swellability of the block polymer obtained can be varied within a wide range, depending on the mutual propportions of the components.

Further details of the invention are illustrated by the following non-limiting Examples.

EXAMPLE 1

Into a reactor at 80° C. 25 ml. of a 6% solution of polyvinyl acetate in toluene is added. 4 g. (0.0035 moles) of $\beta$-cyclodextrin are dissolved in 6 ml. of a 1 N sodium hydroxide solution and the solution obtained is added into the toluene phase with vigorous stirring. Stirring is continued for about half an hour, whereupon 4 ml. (4.5 g., 0.026 moles) of ethylene glycol diepoxy propyl ether are added. Stirring is continued for a further 3.5 hours at 80° C., whereupon the mixture is cooled to room temperature, diluted with 50 ml. of toluene and is allowed to settle. The toluene phase is decanted and the sedimented grains are suspended in a further portion of toluene, settled down, and decanted. Thereafter the product is washed with acetone three subsequent times, followed by washing to neutral with water. The pearl polymer obtained is then dehydrated with a more concentrated acetone/water mixture and is allowed to stand in acetone for at least two hours. Thereafter it is dried in an desiccator at 105° C. for three hours. 6 g. of a polymeric product are obtained containing 45% of cyclodextrin and 0.8% of polyvinyl alcohol. The water uptake (swelling capacity) of the product is 2 g. of water/g. of dry gel; specific volume of the swelled gel: 6 ml./g.

The product was characterized by analytical methods developed for the characterization of cyclodextrin-polyvinyl alcohol polymers, first of all by a microscopic method or by quantitative analysis of the cyclodextrin and polyvinyl alcohol content, respectively or by measuring the water uptake and the specific volume of the swelled gel.

EXAMPLE 2

Following the procedure described in Example 1 but carrying out the cross-linking with 3 ml. (3.5 g., 0.038 moles) of epichlorohydrin in a 25% sodium hydroxide solution a pearl polymer is obtained, containing 50% of cyclodextrin, 2% of polyvinyl alcohol and having a water uptake of 3 g. of water/g. of gel. The specific volume of the swelled gel is 8 ml./g.

EXAMPLE 3

Following the procedure described in Example 1 but dissolving 1 g. (0.0009 moles) of $\beta$-cyclodextrin in a 5% alkaline solution of polyvinyl alcohol and adding 1.5 ml. (1.1 g.; 0.010 moles) of ethylene glycol diepoxy propyl ether to the mixture a pearl polymer is obtained, containing 40% of cyclodextrin and 15% of polyvinyl alcohol. The water uptake of the product amounts to 5 g. of water/g. of gel and the volume of the swelled gel is 20 ml./g.

EXAMPLE 4

Following the procedure described in Example 1 but dissolveing 4 g. (0.0031 moles) of $\gamma$-cyclodextrin in 6 ml. of a 1 N sodium hydroxide solution and adding 4 ml. (0.026 moles) of ethylene glycol diepoxy propyl ether a pearl polymer is obtained, containing 50% of $\gamma$-cyclodextrin and 0.5% of polyvinyl alcohol. The water uptake of the product amounts to 2.5 g. of water/g. of gel and the specific volume of the swelled gel is 7 ml./g.

EXAMPLE 5

A solution containing cyclodextrin and polyvinyl alcohol is admixed with 2 ml. of a solution of 1 g. (0.0009 moles) of β-cyclodextrin in a 1 N sodium hydroxide solution at 80° C. with stirring. To the solution 1 ml. (0.0064 moles) of ethylene glycol diepoxy propyl ether is added and the mixture is poured onto a flat surface before solidification. It is allowed to stand at room temperature for a day, the foil obtained is rinsed in water several more times and is air dried. The product obtained contains 40% of β-cyclodextrin and its water uptake is 4 g. of water/g. of dry polymer.

EXAMPLE 6

A cyclodextrin-polyvinyl alcohol polymer fibers is obtained by heating a mixture of 10 ml. of polyvinyl alcohol and a 1 N alkaline solution containing 15% of polyvinyl alcohol and 3—3% of β-cyclodextrin and ethylene glycol diepoxy and propyl ether at 80° C., and before the mixture becomes gelled it is introduced into a 20% sodium sulphate precipitation bath and fibers are pulled. The product contains 6% of cyclodextrin.

EXAMPLE 7

A cyclodextrin-polyvinyl alcohol polymer fibers is obtained by admixing 5% of ethylene glycol diepoxy propyl ether in a solution containing 15% of polyvinyl alcohol at 70° C. and introducing the mixture obtained into the precipitation bath of 30° C. The bath contains 20% of sodium sulphate, 10% of water-soluble β-cyclodextrin polymer and 2% of sodium hydroxide. The fiber is allowed to stand in the bath for 5 minutes, whereupon it is heated up to 105° C., washed and dried. The obtained fibrous product contains 13% of cyclodextrin.

EXAMPLE 8

The grain distribution of the pearl polymer obtained in Example 1 is determined in a dry state. The mean size on the basis of the number of particles is 53μ, while the means size on the basis of the volume of grains is 67μ. The product is swelled for one day. In a swelled state the mean grain size on the basis of the number of grains is 85μ, while on the basis of the volume of grains it amounts to 107μ. The polymer is then dried and swelled several more times and the mean size of the grains is determined after every period. The distribution does not show any significant difference even after the 10th period, when the mean grain size on the basis of the number of grains for a dry product is 53μ, for a swelled product is 84μ, and the same value on the basis of the volume of particles amounts to 56μ for the dry polymer and 107μ for the swelled polymer.

From the above-described tests the conclusion can be drawn that the cyclodextrin-polyvinyl alcohol polymers can be repeatedly used, the grains do not break up or are distorted even after a lasting stress.

EXAMPLE 9

In cigarette-holders supplied with a filter filled with the pearl polymer prepared according to Examples 1 or 4, the harmful components of the smog are essentially absorbed. In a chloroform extract of the filter a significant amount of nicotine and other harmful components can be detected.

EXAMPLE 10

With the pearl polymer prepared according to Example 1, a column of 1.6 cm. × 40 cm. is filled, and a mixture of 3 mg. of alanine, 0.2 mg. of tyrosine. HCl and 0.3 mg of tryptophan is passed through it. Elution is carried out with a dilute hydrochloric acid solution at a rate of 40 ml./hour.

$[V_e/V_t]$ tryptophan=2.00; tyrosine.HCl: 1.20, alanine: 0.73.

EXAMPLE 11

Following the procedure described in Example 10, a mixture of 3 mg. of aliphatic amino acid mixture (glycine, alanine, valine, leucine, isoleucine, serine, threonine, ciysteine, methionine, asparaginic acid, glutaminic acid, lysine, arginine, histidine, proline and hydrosyproline), 0.1 mg. of phenylamine and 0.3 mg. of tryptophan is subjected to column chromatography. The elution is carried out by distilled water, at a rate of 40 ml./hour. $[V_3/V_t]$ tryptophan: 2.40, phenylaminine: 1.10; mixture of aliphatic amino acids: 0.73.

EXAMPLE 12

Into 50 ml. of a saturated aqueous solution of chloroform and benzene, respectively 1 g. of the β-cyclodextrin-polyvinyl alcohol pearl polymer prepared according to Example 1 is added. From the dilute aqueous solutions the polymer absorbes 50% of the benzene and 60% of the chloroform present, in an hour, at room temperature. The polymer is evidently suitable for the elimination of chloroform and benzene frm aqueous solutions.

EXAMPLE 13

With a pearl polymer prepared according to Example 1, a column of 1.2 cm.×20 cm. is filled and 50 ml of a 0.07% aqueous benzene solution is passed through it at a rate of 40 ml./hour. The water leaving the column is benzene-free. The benzene bound in the complex is elminated by boiling. The polymer can be regenerated and used repeatedly.

EXAMPLE 14

Onto a column according to Example 13, 50 ml. of a 0.3% aqueous p-cresol solution is poured. The water leaving the column does not contain p-cresol.

EXAMPLE 15

Following the procedure described in Example 13 but passing through the column 25 ml. of a 0.05% aqueous O,O-dimethyl-1-hydroxy-2,2,2-trichloroethyl phosphonate solution the water can be freed from the above contamination in a single step.

EXAMPLE 16

Cyclodextrin-polyvinyl alcohol block polymer is prepared in the following way:

To 4 g. of a solution containing 13.2% of polyvinyl alcohol, 15 ml. of a 1 N solution (0.015 moles) of sodium hydroxide are added followed by the addition of 11.5 g.(0.010 moles) of β-cyclodextrin. The mixture is then heated up to 80° C. and 10 ml. (11.2 g., 0.064 moles) of ethylene glycol diepoxy propylether are added with stirring. The formulation of gel can be observed after a 15 to 20-minute standing. The reaction mixture is kept at 80° C., for a further 20 further 20 minutes, cooled to room temperature and allowed to stand for 3 hours.

Thereafter the product is suspended in 100 ml. of water, the suspension is triturated and water is decanted. The polymer is washed with two 100-ml. portions of water. Dehydration is carried out as described in Example 1, using acetone/water mixtures of increasing concentrations. The product is dried at 105° C. 21 g. of a polymeric product are obtained, containing 47% of cyclodextrin and 4.5% of polyvinyl alcohol. The water uptake of the product amounts to 2.2 g. of water/g. of dry polymer, and the specific volume of the swelled product is 5.2 ml./g.

What we claim is:

1. A cyclodextrin-polyvinyl alcohol polymer capable of forming an inclusion complex, and readily swellable in aqueous solution wherein the cyclodextrin and the polyvinyl alcohol are cross-linked with a polyfunctional coupling reactant capable of reacting with the cylcodextrin and the polyvinyl alcohol.

2. The polymer defined in claim 1 in the form of a pearl, fiber, block or foil.

3. A process for the preparation of a cyclodextrin-polyvinyl alcohol polymer capable of forming inclusion complexes, and readily swellable in aqueous solution which comprises cross-linking a cyclodextrin, a mixture of cyclodextrins, or carbohydrate mixtures containing cyclodextrins in the presence of polyvinyl alcohol, polyvinyl acetate or a polyvinyl alcohol-polyvinyl acetate copolymer, with a polyfunctional coupling reactant capable of reacting with the cyclodextrins and with the polymer present.

4. A process as claimed in claim 3, which comprises using an epoxy compound as a polyfunctional reactant.

5. A process as claimed in claim 4, which comprises using epichlorohydrin or ethylene glycol polyether as the epoxy compound.

6. A process as claimed in claim 3, which comprises preparing a cyclodextrin-polyvinyl alcohol polymer in the form of pearls in a two-phase system.

7. A process as claimed in claim 6, which comprises using an alkaline aqueous solution as a reaction medium and a solution of a emulsifying agent as an apolar phase.

8. A process as claimed in claim 7, which comprises using polyvinyl acetate as an emulsifying agent.

9. A process as claimed in claim 3, which comprises preparing a cyclodextrin-polyvinyl alcohol polymer in the form of a foil.

10. A process as claimed in claim 3, which comprises preparing a cyclodextrin-polyvinyl alcohol polymer in the form of fibers.

11. A process as claimed in claim 10, which comprises reacting cyclodextrin with a polyvinyl alcohol fiber in a precipitation bath.

12. A process as claimed in claim 10, which comprises pulling the fibers from a cyclodextrin-polyvinyl alcohol polymer.

13. A process as claimed in claim 11, which comprises using a saturated aqueous solution of sodium sulphate as a precipitation bath.

14. A process as claimed in claim 3, which comprises preparing a cyclodextrin-polyvinyl alcohol polymer by block polymerization.

* * * * *

UNITED STATES PATENT AND TRADEMARK OFFICE
CERTIFICATE OF CORRECTION

PATENT NO. : 4,274,985
DATED : 23 June 1981
INVENTOR(S) : Jozsef SZEJTLI et al

It is certified that error appears in the above-identified patent and that said Letters Patent is hereby corrected as shown below:

In the claims, column 8, claim 5, line 2,

"ethylene glycol polyether" should read:

-- ethylene glycol diepoxy propylether --.

Signed and Sealed this

First Day of October 1985

[SEAL]

Attest:

DONALD J. QUIGG

Attesting Officer

Commissioner of Patents and
Trademarks—Designate